United States Patent
Khanduri

(10) Patent No.: US 10,146,676 B1
(45) Date of Patent: Dec. 4, 2018

(54) MULTI-VERSION REGRESSION TESTER FOR SOURCE CODE

(71) Applicant: Twitter, Inc., San Francisco, CA (US)

(72) Inventor: Puneet Khanduri, Menlo Park, CA (US)

(73) Assignee: Twitter, Inc., San Francisco, CA (US)

(*) Notice: Subject to any disclaimer, the term of this patent is extended or adjusted under 35 U.S.C. 154(b) by 19 days.

(21) Appl. No.: 15/194,106

(22) Filed: Jun. 27, 2016

Related U.S. Application Data

(60) Provisional application No. 62/185,544, filed on Jun. 26, 2015.

(51) Int. Cl.
  *G06F 11/36* (2006.01)
  *G06F 8/71* (2018.01)

(52) U.S. Cl.
  CPC ........... *G06F 11/3692* (2013.01); *G06F 8/71* (2013.01); *G06F 11/3664* (2013.01)

(58) Field of Classification Search
  CPC ..................................... G06F 11/36–11/3696
  See application file for complete search history.

(56) References Cited

U.S. PATENT DOCUMENTS

| | | | | |
|---|---|---|---|---|
| 9,558,106 B1* | 1/2017 | Moniz | ............... | G06F 11/3692 |
| 2005/0102653 A1* | 5/2005 | Henderson | ......... | G06F 11/3688 717/126 |
| 2006/0085132 A1* | 4/2006 | Sharma | ............ | G06F 11/3688 702/1 |
| 2007/0061626 A1* | 3/2007 | Nelson | ............ | G06F 11/3688 714/38.14 |
| 2015/0347282 A1* | 12/2015 | Wingfors | ......... | G06F 11/3688 717/125 |

OTHER PUBLICATIONS

Mirarab, Siavash, and Ladan Tahvildari. "A prioritization approach for software test cases based on bayesian networks." International Conference on Fundamental Approaches to Software Engineering. Springer, Berlin, Heidelberg. (Year: 2007).*
McKeeman, William M. "Differential testing for software." Digital Technical Journal 10.1 (1998): p. 100-107. (Year: 1998).*

* cited by examiner

*Primary Examiner* — Chameli Das
*Assistant Examiner* — Joanne G Macasiano
(74) *Attorney, Agent, or Firm* — Brake Hughes Bellermann LLP

(57) ABSTRACT

A system and method for performing regression testing on source code provides a data sample to one or more candidate instances executing a candidate version of source code for a code base and provides the data sample to plurality of baseline instances executing a baseline version of the source code. The baseline version of the source code and the candidate version of the source code differ. The regression testing system and method obtains candidate outputs from the one or more candidate instances and obtains baseline outputs from the plurality of baseline instances based on the provided data sample. One or more faults in the candidate version of the source code can be determined by comparing the candidate outputs the baseline outputs. A filter for excluding one or more data fields from the comparison can be generated based on a comparison between baseline outputs from one of the plurality of baseline instances and baseline outputs from another of the plurality of baseline instances. Faults can also be determined based on satisfaction of a sample count, a relative threshold, an absolute threshold, or a median absolute deviation comparison.

18 Claims, 10 Drawing Sheets

TimelineService

| | getActivityUsersTimeline | | |
|---|---|---|---|
| | 1324733 | 45647 | 3.45 |
| | REQUESTS | DIFFS | % FAILING |

Request
timeline_queries

Primary Response

```
Success
    entries
        0       user_id: 111
        1       user_id: 954
        2       user_id: 478
       ┌─────────────────────┐
        3       user_id: 294 
       └─────────────────────┘
```

Candidate Response

```
Success
    entries
        0       user_id: 111
        1       user_id: 954
        2       user_id: 478
       ┌─────────────────────┐
       └─────────────────────┘
```

| FIELD | result/success/entries/SeqSizeDifference |
|---|---|
| EXPECTED | Missing elements: Vector((user_id,294)) |
| ACTUAL | Unexpected elements: Vector() |

| FIELD | result/success/entries/SeqSizeDifference |
|---|---|
| EXPECTED | Missing elements: Vector((user_id,344)) |
| ACTUAL | Unexpected elements: Vector() |

| FIELD | result/success/entries/SeqSizeDifference |
|---|---|
| EXPECTED | Missing elements: Vector((user_id,171)) |
| ACTUAL | Unexpected elements: Vector() |

| FIELD | result/success/entries/SeqSizeDifference |
|---|---|
| EXPECTED | Missing elements: Vector((user_id,313)) |
| ACTUAL | Unexpected elements: Vector() |

| FIELD | result/success/entries/SeqSizeDifference |
|---|---|
| EXPECTED | Missing elements: Vector((user_id,542)) |
| ACTUAL | Unexpected elements: Vector() |

Last Reset
Exclude Noi
getActivityU
1324733 Requ   FAILING
getTimelines
12480285 Rec
searchTimel
44022 Reques
getPerspect
13548890 Rec
previewTime
187477 Requests
getOldestMessage   0.0 %
1987 Requests      FAILING

FIG. 7

MULTI-VERSION REGRESSION TESTER FOR SOURCE CODE

CROSS REFERENCE TO RELATED APPLICATION

This application is a non-provisional of, and claims the benefit of, U.S. Patent Application No. 62/185,544, filed on Jun. 26, 2015, entitled "HANDS OFF REGRESSION TESTING," which is incorporated by reference herein in its entirety.

TECHNICAL FIELD

The following relates to testing of software.

BACKGROUND

Software projects can include development of services, applications, and/or platforms and the components of those services, applications, and/or platforms that operate together to provide functionality. In many software project architectures, components may be dependent on one another, and a fault in a first component can cause downstream faults in those components dependent on the first component. For example, in a services oriented architecture, a first service may receive a request from a user application. To fulfill the request, the first service may request data from a second service. The second service may, in turn, request data from a third service and a fourth service. As a result, the first service is dependent on the second, third, and fourth services to fulfill the request from the user application and a fault in any of the first, second, third, or fourth services can cause an error when responding to the user application request.

Development of software projects, especially large scale software projects, can be done using an iterative lifecycle where source code modifications to the code base for the project are released periodically. For example, modifications can be made to source code to address defects, improve functionality, or provide additional features. During development, modifications to source code create an opportunity for inadvertent defects to arise in a particular iteration or version. For example, in some cases, correcting a fault in a component, such as a null pointer reference error, can introduce another fault such as an array out-of-bounds error in that same component. As another example, adding a new feature or modifying code for one component can introduce downstream faults in dependent components. For example, a source code modification to address a defect in a first component may cause the first component to incorrectly determine a data value provided to a second component resulting in a fault in the second component. As a result, some software development projects utilize regression testing before releasing an updated version of the code base to ensure that the software project still performs as expected. Regression testing can include, among other things, executing unit tests, component tests, and/or integration tests on the code base. Unit testing can include testing discrete functionality, such as a function or method of a component, separate from the rest of the component. Component testing can include testing the overall functionality of a component separate from the other components in the overall architecture. Integration testing can include applying a test plan to multiple components with the goal of testing behavior of the overall architecture, or a part of the overall architecture. While unit testing, component testing, and integration testing are generally automated, time and resources (including manpower and computing resources) must be devoted to development and execution of the test cases used in such testing.

SUMMARY

A multi-version regression tester tests source code of a code base by applying a data sample to at least three processes executing two versions of the source code. The first process, or candidate instance, executes a version of the source code that is being regression tested ("candidate version"). The second process, or primary baseline instance, executes a version of the source code that is used as a baseline to determine if the candidate version has defects. The third process, or secondary baseline instance, executes the same version of the source code as the primary baseline instance. The regression tester compares outputs from the primary and secondary baseline instances to determine if certain data fields produce output that is independent of the input provided to them. The regression tester can exclude those data fields when determining whether the candidate instance has defects.

In one aspect, a method for performing regression testing on source code for a software code base includes providing a data sample as input to a candidate instance executing a candidate version of the source code and providing the data sample to a primary baseline instance executing a baseline version of the source code. The baseline version of the source code and the candidate version of the source code differ. The method also provides the data sample to a secondary baseline instance executing the baseline version of the source code. The method obtains a candidate output from the candidate instance, a primary output from the primary baseline instance, and a secondary output from the secondary baseline instance. The candidate output, the primary output, and the secondary output are based on the data sample. The method compares the primary output and the secondary output to generate a filter for excluding one or more data fields when comparing the primary output and the candidate output and determining one or more faults in the candidate version of the source code by applying the generated filter to the candidate output.

Various implementations of this aspect may include one or more of the following features. The method's generation of the filter can include identifying a value for a data field that is different in the primary output and the secondary output, and applying the filter to the comparison of the candidate output and the primary output can include excluding the data field in the determination of the one or more faults. In some implementations, the method provides a user interface describing the one or more faults. In some implementations the code base is for a service.

Other embodiments of this aspect include corresponding computer systems, apparatus, and computer programs recorded on one or more computer storage devices, each configured to perform the operations of the method summarized above.

In another aspect, a regression testing system for performing regression testing on source code includes a processor and a memory storing instructions that when executed by the processor cause the processor to provide a data sample to one or more candidate instances executing a candidate version of the source code and provide the data sample to a plurality of baseline instances executing a baseline version of the source code, wherein the baseline version of the source code and the candidate version of the source code differ. The processor obtains candidate outputs from the one or more candidate instances, the candidate outputs being based on the data sample provided to the one or more candidate instances and obtains baseline outputs from the plurality of baseline instances, the baseline outputs being based on the data sample provided to the plurality of baseline instances. The processor then determines one or more faults in the candidate version of the source code by comparing the candidate outputs to the baseline outputs.

In one implementation, the determining of the one or more faults in the candidate version by the regression testing system can include comparing output from one of the plurality of baseline instances to output from another of the plurality of baseline instances to generate a filter for excluding one or more data fields when comparing the candidate outputs to the baseline outputs. The generating of the filter can include identifying a value for a data field that is different in the output from the one of the plurality of baseline instances and the output from the another of the plurality of baseline instances, and determining the one or more faults in the candidate version of the code base can include applying the generated filter to exclude the data field when comparing the candidate outputs to the baseline outputs.

In some implementations, the regression testing system's determining of the one or more faults can include a determination of a sample count, a relative threshold calculated based on a variance within the baseline outputs and a difference between the baseline outputs and the candidate outputs, an absolute threshold based on a difference between the baseline outputs and the candidate outputs when compared to the baseline outputs and/or comparing a median absolute deviation for the baseline outputs and a median absolute deviation for the candidate outputs. In some implementations, the baseline outputs and the candidate outputs include performance related values. In some implementations, the regression system provides a user interface describing the one or more faults in the candidate version.

In some implementations, the regression testing system initiates the execution of the one or more candidate instances on a computing cluster, wherein each of the one or more candidate instances is executed by a different processor in the computing cluster and/or initiates the execution of the plurality of baseline instances on a computing cluster, wherein each of the baseline instances is executed by a different processor in the computing cluster.

Other embodiments of this aspect include corresponding methods configured to perform the operations of the processor of the regression testing system according to the instructions stored in the regression testing system's memory.

In another aspect, a method for performing regression testing on source code for a service includes providing sample data as input to a plurality of candidate services executing an instance of a candidate version of the source code for the service and providing the sample data as input to a plurality of baseline services executing an instance of a baseline version of the source code for the service, wherein the baseline version of the source code and the candidate version of the source code differ. The method can also include obtaining candidate outputs from the plurality of candidate services, wherein the candidate outputs describe a candidate performance metric for the candidate version of the service and obtaining baseline outputs from the plurality of baseline services, wherein the baseline outputs describe a baseline performance metric for the baseline version, the baseline performance metric having a same type as the candidate performance metric. The method can further include determining one or more faults in the candidate version of the service by comparing the candidate outputs to the baseline outputs.

In some implementations of this aspect, determining the one or more faults includes a determination that a sample count corresponding to the sample data stream satisfies a sample count threshold. Determining the one or more faults can further include a determination that at least one of a relative threshold, an absolute threshold, or a median absolute deviation threshold are satisfied. In some implementations, the relative threshold is determined based on a variance within the baseline outputs and a difference between the baseline outputs and the candidate outputs, the absolute threshold is determined based on a difference between the baseline outputs and the candidate outputs when compared to the baseline outputs, and the median absolute deviation threshold is determined based on comparing a median absolute deviation for the baseline outputs and a median absolute deviation for the candidate outputs.

Other embodiments of this aspect include corresponding computer systems, apparatus, and computer programs recorded on one or more computer storage devices, each configured to perform the operations of the method summarized above.

The details of one or more implementations are set forth in the accompa-nying drawings and the description below. Other features will be apparent from the description and drawings, and from the claims.

BRIEF DESCRIPTION OF THE DRAWINGS

FIG. 7 shows an example user interface consistent with disclosed embodiments.

DETAILED DESCRIPTION

Figure 1A:
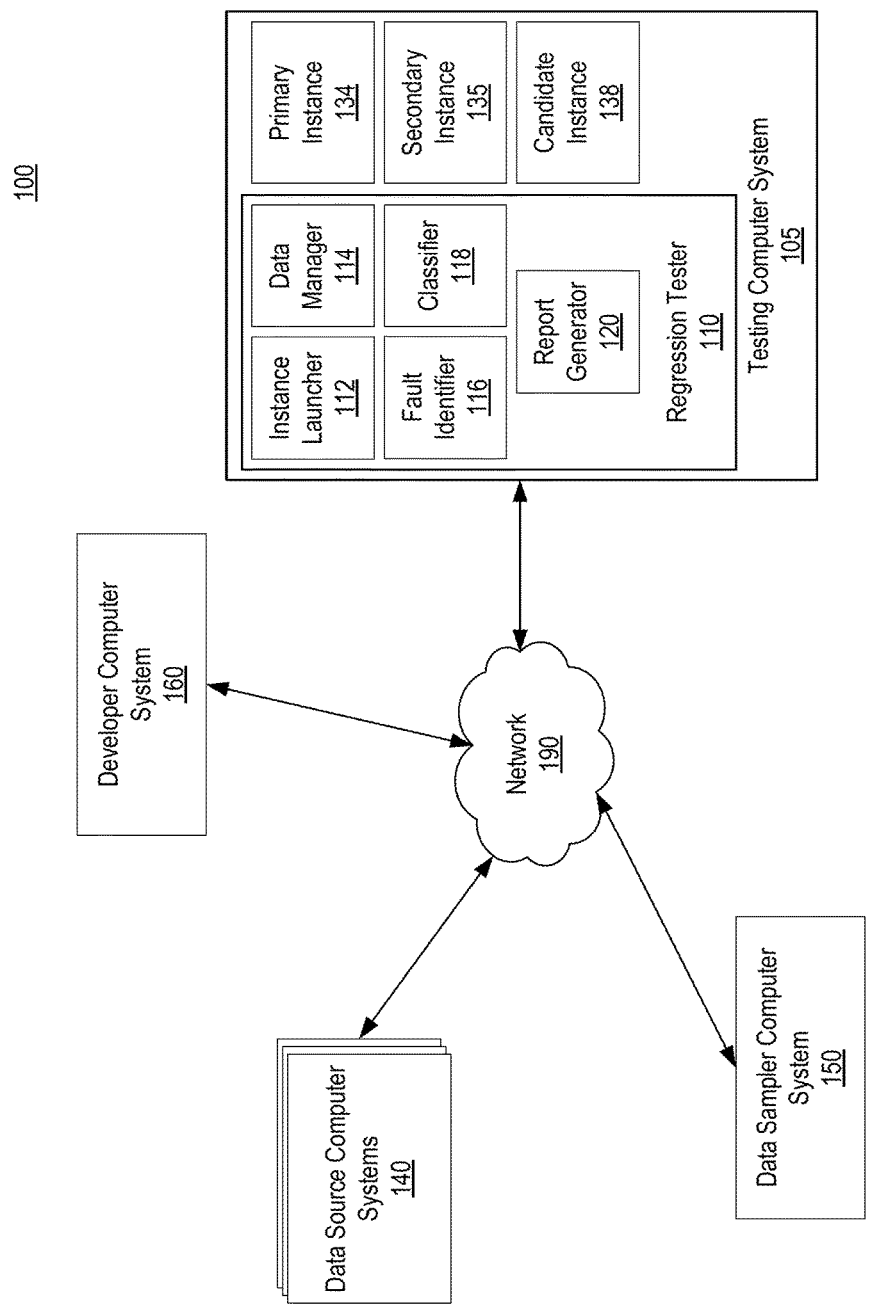
FIG. 1A-1C show example regression testing systems consistent with disclosed embodiments.

One disadvantage of using unit, component, and integration testing is that they can demand more resources than developing the code being tested. For example, one unit test typically tests one execution path through a function or method. But, the function or method may have five total execution paths. Assuming it takes the same time and resources to develop a unit test as it does to develop the function or method being tested, it may take five times the amount of time and resources to ensure 100% code path coverage during unit testing, or unit testing may cover only a fraction (in this case 20%) of the execution paths in that function or method if the same amount of time is spent developing the unit test. The disadvantage increases during component testing and integration testing. For example, if the component is a service, and a request to the service triggers calls to five methods each of which have five independent code paths, close to 15,000 tests would be required to ensure 100% code path coverage. For integration testing, where multiple components each having multiple methods in their interfaces, and where each request can result in the execution of multiple methods, 100% code coverage may not be possible, and is likely not feasible. As complexity in a software project grows, the relative impact of each unit, component, and integration test decreases requiring the need for more tests to ensure adequate coverage of the source code in the code base. As a result, the cost of testing increases.

In addition to the resources regression testing consumes, the amount of time required to execute regression testing can sometimes exceed the development life cycle for a version of the code base being tested. For example, in an agile software development lifecycle, new versions may be released on a weekly basis, and it may take longer than a week to execute the unit, component, and integration tests required to adequately cover the execution paths of the code base.

Another disadvantage of conventional unit, component, and integration testing is that inputs used during testing may not be production traffic (e.g., traffic from actual users once the version of the code base is deployed) but rather staged traffic (e.g., simulated traffic prepared by developers). While staged traffic can ensure coverage of particular execution paths, it can be ineffective because it may not contain user errors or data values that arise during production that were not anticipated when configuring the staged traffic. Also, use of staged traffic may not adequately simulate variations in traffic that might occur during production.

Although, production traffic may provide more accurate and/or robust data samples to use during testing, it can include noise. For example, production traffic may include server generated timestamps, outputs of random number generators, data resulting from non-deterministic methods, or data resulting from race conditions in the code base that have little, if any, effect on functionality. Such noise can increase the quantity of false positives detected when performing regression testing using production traffic because automated software testing typically analyzes differences in outputs without considering the nature of the outputs. False positives can be undesirable because any resources devoted to addressing the false positive are wasted—the resources were expended addressing a "fault" that did not exist.

Accordingly, the present disclosure describes a multi-version regression tester. The regression tester uses production traffic, or data samples from the production traffic, and multicasts it to a plurality of instances executing source code under test. The regression tester can also detect and filter noisy data fields.

In some embodiments, the regression tester communicates with instances executing a candidate version of the source code (a candidate instance) and two instances executing a baseline version of the source code (a primary baseline instance and a secondary baseline instance). The candidate version can be, for example, a version of the source code for the code base that is yet to be released, and the baseline version can be, for example, a version of the source code for the code base that has already been released or has previously passed regression testing. By using two instances of the baseline version of the source code, and applying the same input to the two versions, the regression tester can identify one or more data fields that can result in different output based on the same input (e.g., noisy or non-deterministic data fields). The regression tester can filter out the identified data fields by excluding them when comparing the output from the candidate version and the primary baseline version to identify faults in the candidate version, as described in more detail below.

In some embodiments, the regression tester communicates with one or more instances executing a candidate version of the source code for the code base (candidate instances) and a plurality of instances executing a baseline version of the source code for the code base (baseline instances). The candidate instances can execute on a first computing cluster and the baseline instances can execute on a second computing cluster. The regression tester can use a classifier to analyze the outputs of the candidate instances and the baseline instances to detect potential faults in the candidate based on one or more of a sample count, a relative threshold, an absolute threshold, or a median absolute deviation, as described in more detail below.

FIG. 1A illustrates, in block form, system 100 for performing regression testing for source code of a code base. In the embodiment illustrated in FIG. 1A, testing computer system 105, data source computer systems 140, data sampler computer system 150, and developer computer system 160 can communicate using network 190.

System 100 outlined in FIG. 1A can be computerized, wherein each of the illustrated components comprises a computing device that is configured to communicate with other computing devices via network 190. For example, developer computer system 160 can include one or more computing devices, such as a desktop, notebook, or hand-held computing device that is configured to transmit and receive data to/from other computing devices via network 190. Similarly, testing computer system 105, data source computer systems 140, data sampler computer system 150 can include one or more computing devices that are configured to communicate data via the network 190. For example, testing computer system 105, data source computer systems 140, data sampler computer system 150 can include one or more servers or computing clusters. In some embodiments, these computing systems can be implemented using one or more computing devices dedicated to performing the respective operations of the systems as described herein.

Depending on the embodiment, network 190 can include one or more of any type of network, such as one or more local area networks, wide area networks, personal area networks, telephone networks, and/or the Internet, which can be accessed via any available wired and/or wireless communication protocols. For example, network 190 can comprise an Internet connection through which testing computer system 105 and data source computer systems 140 communicate. Any other combination of networks, including secured and unsecured network communication links are contemplated for use in the systems described herein.

According to some embodiments, testing computer system 105 can include regression tester 110. Regression tester 110 can perform one or more operations for regression testing source code for a code base of a software project as described herein, such as the operations described with respect to FIG. 3 and FIG. 5 below. In some embodiments, regression tester 110 can include multiple modules and/or components for performing its operations, and these modules and/or components can include, for example, instance launcher 112, data manager 114, fault identifier 116, classifier 118, and report generator 120. The modules and/or components of regression tester 110 can communicate with each other according to known data communication techniques, including interprocess or remote communication techniques and, in some embodiments, can communicate with external computing systems such as data sampler computer system 150 or developer computer system 160. According to some embodiments, functionality performed by one described module and/or component of regression tester 110 can be performed by other modules and/or components of regression tester 110, or in some embodiments, the functionality of one described module and/or component may be divided into additional modules and/or components. This disclosure describes the functionality of regression tester 110 using modules and/or components for the ease of discussion, and any such discussion does not limit regression tester 110 based on the discussion of one module and/or component performing a particular function or operation of regression tester 110.

In some embodiments, regression tester 110 includes instance launcher 112. In some embodiments, instance launcher 112 performs operations to launch and configure an instance of regression tester 110. For example, instance launcher may open ports to receive data samples from data sample computer system 150 or establish communication with primary instance 134, secondary instance 135, and candidate instance 138. According to some embodiments, instance launcher 112 can also start a web server for hosting requests for reports generated by report generator 120, or launch a process for providing reports generated by report generator 120. For example, instance launcher may start a web server to which developer computer system 160 may connect to view a web page or user interface displaying faults in the candidate version (such as the user interfaces shown in FIGS. 6 and 7).

In some embodiments, instance launcher 112 includes a command line tool, or uses a command line tool, for users to begin regression testing. For example, in some embodiments, instance launcher 112 can include a Java program that can be started using a Java virtual machine launched from a command line instruction or a script. In some embodiments, instance launcher 112 can be an executable that can be launched from a console prompt or shell, or it can be an executable that when launched includes a user interface allowing a user to begin regression testing. Instance launcher 112 can also be in communication with developer computer system 160 allowing for remote launching of regression tester 110. For example, in some embodiments, instance launcher 112 can include a server that listens for remote requests such as requests from developer computer system 160, to launch regression tester 110.

According to some embodiments, instance launcher 112 can receive one or more parameters from a user that configure instance launcher 112 to begin regression testing and/or configure the regression testing environment. For example, instance launcher 112 can receive parameters describing the hosts and ports for connecting with primary instance 134, secondary instance 135, and candidate instance 138. The parameters can also describe, for example, the protocols used by the code base under test to receive and send requests such as HTTP or Thrift, for example. The one or more parameters can also describe, in some embodiments, ports on which instance launcher 112 could send and/or receive requests. The one or more parameters can be provided as arguments when starting instance launcher 112, such as by using command line prompts or values entered into a user interface. In some embodiments, the one or more parameters can be provided in a configuration file that is read by instance launcher 112 when instance launcher 112 begins execution.

According to some embodiments, instance launcher 112 can perform operations to instantiate one or more instances executing versions of source code for a code base. For example, instance launcher 112 can instantiate primary instance 134 which can include a process executing an instance of a baseline version of a code base, secondary instance 135 which can include a process executing another instance of the baseline version of the code base, and candidate instance 138 which can be include process executing a candidate version of the code base. In the embodiment shown in FIG. 1A, instance launcher 112 can instantiate primary instance 134, secondary instance 135, and candidate instance 138 on a processor or group of processors of testing computer system 105. In some embodiments, instance launcher 112 can cause a processor or group of processors on a remote computer (such as test deployment computer system 130 shown in FIG. 1B) to execute one of primary instance 134, secondary instance 135, or candidate instance 138. In such embodiments, instance launcher 112 may receive one or more parameters describing the location, name and execution parameters of primary instance 134, secondary instance 135, and candidate instance 138, and instance launcher 112 may use these parameters to instantiate each instance. As used herein, the term instantiate can include, among other things, starting a process, performing operations that result in starting a process, making a remote call to start a process, or allocating memory for an object, group of objects, processes and/or threads.

Once started, instance launcher 112 can communicate with other components of regression tester 110 to perform regression testing consistent with disclosed embodiments. For example, instance launcher 112 can communicate with data manager 114 to provide data samples collected from data sampler computer system 150 or data source computer systems 140 as input to primary instance 134, secondary instance 135, and candidate instance 138. According to some embodiments, data manager 114 can expose a proxy for receiving data samples, such as production traffic, from data sampler computer system 150. For example, data manager 114 can include a server that listens on a port for a data stream provided by data sampler computer system 150. In some embodiments, data manager 114 can request data samples from data sampler computer system 150. After data manager 114 receives the data samples, it can multicast the data samples to primary instance 134, secondary instance 135, and candidate instance 138. According to some embodiments, data manager 114 may use one or more parameters specifying the location and port of primary instance 134, secondary instance 135, and candidate instance 138 to multicast the data samples. According to some embodiments, the one or more parameters may be provided to data manager 114 from instance launcher 112, and instance launcher 112 may obtain the one or more parameters from user input or configuration file as described above.

In some embodiments, data manager 114 may use a data specification describing an application programming interface (API) that facilitates communication with primary instance 134, secondary instance 135, and candidate instance 138. For example, the data specification may include XML code, protobuf code, interface definition language (IDL) code, or any other known technology for identifying and communicating with APIs of applications or services. In some embodiments, data manager 114 applies data samples obtained from data sampler computer system 150 to primary instance 134, secondary instance 135, and candidate instance 138 according to the data specification. The data specification, in some embodiments, may be requested by data manager 114 from one of primary instance 134, secondary instance 135, or candidate instance 138 according to a request protocol known by data manager 114 and primary instance 134, secondary instance 135, or candidate instance 138. For example, primary instance 134, secondary instance 135, and candidate instance 138 can include a common library or other code that facilitates remote procedure call (RPC) communication with data manager 114, and the library or other code can include and common API for exposing the APIs of primary instance 134, secondary instance 135, and candidate instance 138 to data manager 114. For example, data manager 114, primary instance 134, secondary instance 135, and candidate instance 138 may each reference and include a library called "rtcommon.so." The rtcommon.so library can include a method called getDataSpecification that allows data manager 114 to request the data specification. The rtcommon.so library can also include an interface that can be implemented by source code in the code base executed by primary instance 134, secondary instance 135, and candidate instance 138 that when called provides a response to the getDataSpecification method call.

According to some embodiments, data manager 114 can use known network protocols to send input and receive output to primary instance 134, secondary instance 135, and candidate instance 138. For example, when primary instance 134, secondary instance 135, and candidate instance 138 execute source code for a service or a web service, data manager 114 can send requests via HTTP to primary instance 134, secondary instance 135, and candidate instance 138. In some embodiments, data manager 114 can utilize alternative protocols such as, for example, Apache Thrift, to send input and receive output.

In some embodiments, data manager 114 can use the data specification to receive outputs from each of primary instance 134, secondary instance 135, and candidate instance 138. In some embodiments, the outputs can be received as callbacks associated with requests sent to primary instance 134, secondary instance 135, and candidate instance 138. For example, if data manager 114 provides input to a method via an API that has a return value, the output could include the return value. As another example, data manager 114 can receive output using the call and response mechanism of the protocol being used to communicate with primary instance 134, secondary instance 135, and candidate instance 138. For example, if data manager 114 is using the HTTP protocol, it can provide input via POST and receive output via GET.

According to some embodiments, data manager 114 can be in communication with fault identifier 116. In some embodiments, fault identifier 116 can detect potential faults in candidate instance 138 by comparing outputs received from primary instance 134 and candidate instance 138 when data manager 114 has provided the same data sample as input to primary instance 134 and candidate instance 138. For example, data manager 114 may apply as input "9876" to a method of primary instance 134 and candidate instance 138 called "getUserNameForID(int id)." If, primary instance 134 and candidate instance 138 both return the same value (for example "John Smith") then fault identifier 116 may not detect a fault in the "getUserNameForID(int id)" method for candidate instance 138. But, on the other hand, if primary instance 134 and candidate instance 138 return different values (for example "John Smith" and "Jane White") then fault identifier 116 may detect a fault in the "getUserNameForID(int id)" method for candidate instance 138.

In some embodiments, fault identifier 116 can perform operations and functions for generating filters to exclude one or more data fields from the comparison of outputs received from primary instance 134 and candidate instance 138. Fault identifier 116 can identify the one or more data fields for the filter by comparing output obtained from primary instance 134 and secondary instance 135 when data manager 114 has applied the same input data sample to primary instance 134 and secondary instance 135. For example, data manager 114 may apply as input "request id=12345" to a method of primary instance 134 and secondary instance 135 called "getProcessTime(string parameter)." Due to network latencies or hardware configurations, primary instance 134 and secondary instance 135 may have different processing times for the request matching ID number "12345" and provide different output to data manager 114. But, since the source code being executed by primary instance 134 and secondary instance 135 is the same, fault identifier 116 can determine that the "getProcessTime(string parameter)" provides noisy or nondeterministic output and may not be relied on to determine whether there are faults in candidate instance 138. In some embodiments, fault identifier 116 may exclude output from "getProcessTime(string parameter)" when comparing the outputs of primary instance 134 and candidate instance 138 to identify potential faults in candidate instance 138. In some embodiments, fault identifier may create a notification in a user interface that output from "getProcessTime(string parameter)" may be noisy.

In some embodiments, regression tester 110 can include classifier 118. Classifier 118 can be in communication with data manager 114 to receive outputs from one or more candidate instances executing the candidate version of source code for a code base and a plurality of baseline instances executing a baseline version of the source code for the code base. In some embodiments, the one or more candidate instances can include candidate instance 138, and the plurality of baseline instances can include primary instance 134 and secondary instance 135. The functions and operations of classifier 118 are described in more detail below with respect to FIG. 1C.

According to some embodiments, regression tester 110 can also include report generator 120. Report generator 120 can generate and provide one or more user interfaces for communicating the results of fault identifier 116 and classifier 118. For example, report generator 120 can generate a webpage that displays the percentage of faults identified by fault identifier 116 for a method of candidate instance 138. Report generator 120 can also generate user interfaces describing what percentage of differences between candidate instance 138 and primary instance 134 can be attributed to noise or nondeterministic outputs. Examples of some user interfaces generated by report generator 120 are described with respect to FIGS. 6 and 7. In some embodiments, report generator 120 can generate reports showing the results of regression tester 110 testing candidate instance 138 and deliver the reports by email to developer computer system 160 or other computer systems in communication with testing computer system 105 via network 190. Report generator 120 can also include a server that responds to requests for reports or fault statistics for a particular method of candidate instance 138, in some embodiments. For example, report generator 120 can include a server that listens for requests for statistics related to a "getUserNameForID(int id)" method for candidate instance 138. Report generator 120 can respond to such a request by providing the number of times input was provided to "getUserNameForID(int id)", the percentage of times that input resulted in a fault, and the percentage of times there was a difference between the output received from primary instance 134 and secondary instance 135 for the same input (or noise that regression test 110 detected for the "getUserNameForID(int)" method). In some embodiments, a client application executing on developer computer system 160, or some other remote computer system, can provide the requests to the server of report generator 120 and receive and display the generated user interfaces.

With reference again to FIG. 1A, system 100 can include data source computer systems 140. Data source computer systems 140 can include one or more computer systems that provide data to instances executing the code base corresponding to the source code being regression tested by regression tester 110. For example, regression tester 110 may be testing a code base for a service that is part of a social media platform. In such an example, data source computer systems 140 can include user data that is collected from a plurality of user devices (not shown) executing applications that are part of the social media platform (e.g., mobile device applications, web browsers) and communicated to services of the social media platform. For example, data source computer systems 140 may provide user originated data including user comments, photos, user ratings, user activity, user messages, advertisements, and/or informational postings authored by users to the social media platform. In some embodiments, data source computer systems 140 can provide production traffic, or real data from users intended to be used with deployed instances of services and applications of the code base, to regression tester 110. In some embodiments, data source computer systems 140 can include one or more computer systems that provide staged traffic, or simulated data created for the purpose of testing the code base, to regression tester 110. In some embodiments, the source computer systems 140 can provide a combination of production traffic and staged traffic.

According to some embodiments, system 100 can include data sampler computer system 150. Data sampler computer system 150 can perform functions and operations to monitor data streams generated by data source computer systems 140 and route a copy of the data to regression tester 110. For example, data source computer systems 140 can be producing production traffic intended to be processed by a deployed and tested version of a code base. Regression tester 110 can be configured for regression testing source code of the code base yet to be deployed using production traffic. In such an example, data sampler computer system 150 may copy data samples from the production traffic to provide to regression tester 110. By using data sampler computer system 150, regression tester 110 can receive a sampled subset of the production traffic for testing a code base without disrupting the flow of production traffic from data source computer systems 140 to the deployed production version of the code base.

In some embodiments, system 100 can include developer computer system 160. Developer computer system 160 can be operated by one or more users developing source code for the code base tested by regression tester 110. Using developer computer system 160, users may launch instances of regression tester 110, primary instance 134, secondary instance 135, and/or candidate instance 138 as described above. Developer computer system 160 can also make requests for reports generated by regression tester 110.

Figure 1B:
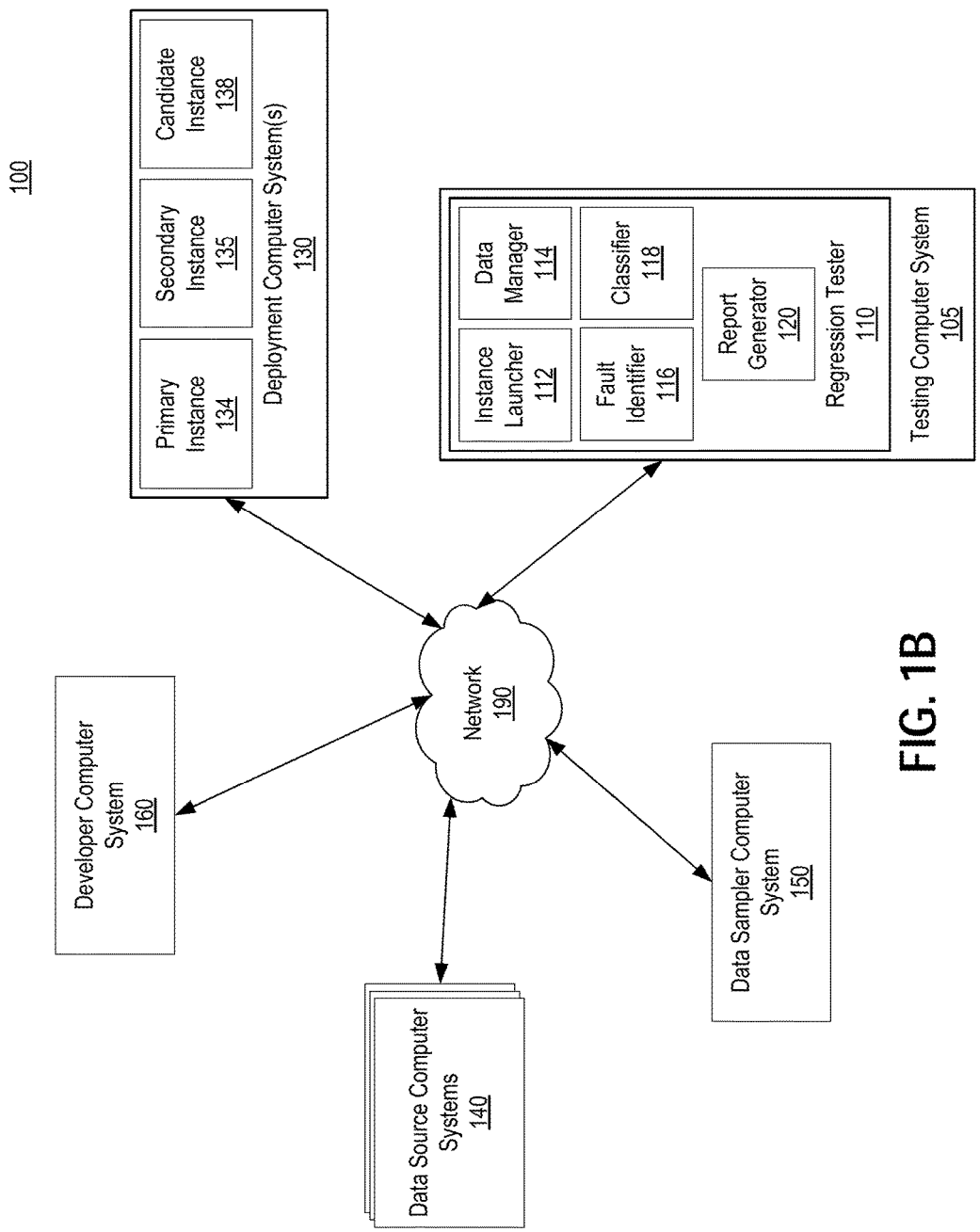

FIG. 1B shows another embodiment of system 100. In the embodiment of FIG. 1B, primary instance 134, secondary instance 135, and candidate instance 138 execute on one or more deployment computer systems 130 as opposed to testing computer system 105. In some embodiments, regression tester 110, data source computer systems 140, data sampler computer system 150, and developer computer system 160 can perform the same or similar functionality as described above with respect to FIG. 1A.

In some embodiments, primary instance 134, secondary instance 135, and candidate instance 138 each execute within their own respective deployment computer systems 130. For example, primary instance 134 may execute on a first deployment computer system 130, secondary instance 135 may execute on a second deployment computer system 130, and candidate instance 138 may execute on a third deployment computer system 130. In another embodiment, primary instance 134, secondary instance 135, and candidate instance 138 execute on the same processor of deployment computer system 130. Although the location of primary instance 134, secondary instance 135, and/or candidate instance 138 may vary in different embodiments, primary instance 134, secondary instance 135, and candidate instance 138 can perform the same or similar functionality as described above with respect to FIG. 1A without departing from the sprit and scope of disclosed embodiments.

According to some embodiments, instances executing source code of a code base tested by regression tester 110 can output performance values. Performance values can include, but are not limited to, values indicating response times for requests, latencies, memory usage, processor instruction counts, or other metrics indicative of the speed or efficiency of a computing system. In some cases, performance values can depend on not only the software executed by a computer system, but also hardware and network conditions affecting the computer system. As a result, multiple instances executing source code of the code base on multiple computing systems may be needed to regression test performance because it can be unclear whether performance related faults (such as decreases in response time) are the result of a software defect, differences between a testing computer systems' hardware or network conditions, or defects in the testing computer systems' hardware or network.

Output of performance values can include output from methods of a code base such as the response to a method requesting processing time. For example, the code base may expose a "getProcessingTime(int processId, String timestamp)" method that returns a value representing the processing time for the passed in process identifier and timestamp. In some embodiments, the output can be calculated by data manager 114 or some other component of regression tester 110. For example, data manager 114 may calculate the response time for requests sent to primary instance 134, secondary instance 135 and/or candidate instance 138 by beginning a timer when a request is made, and ending the timer when the response to the request is received.

Figure 1C:
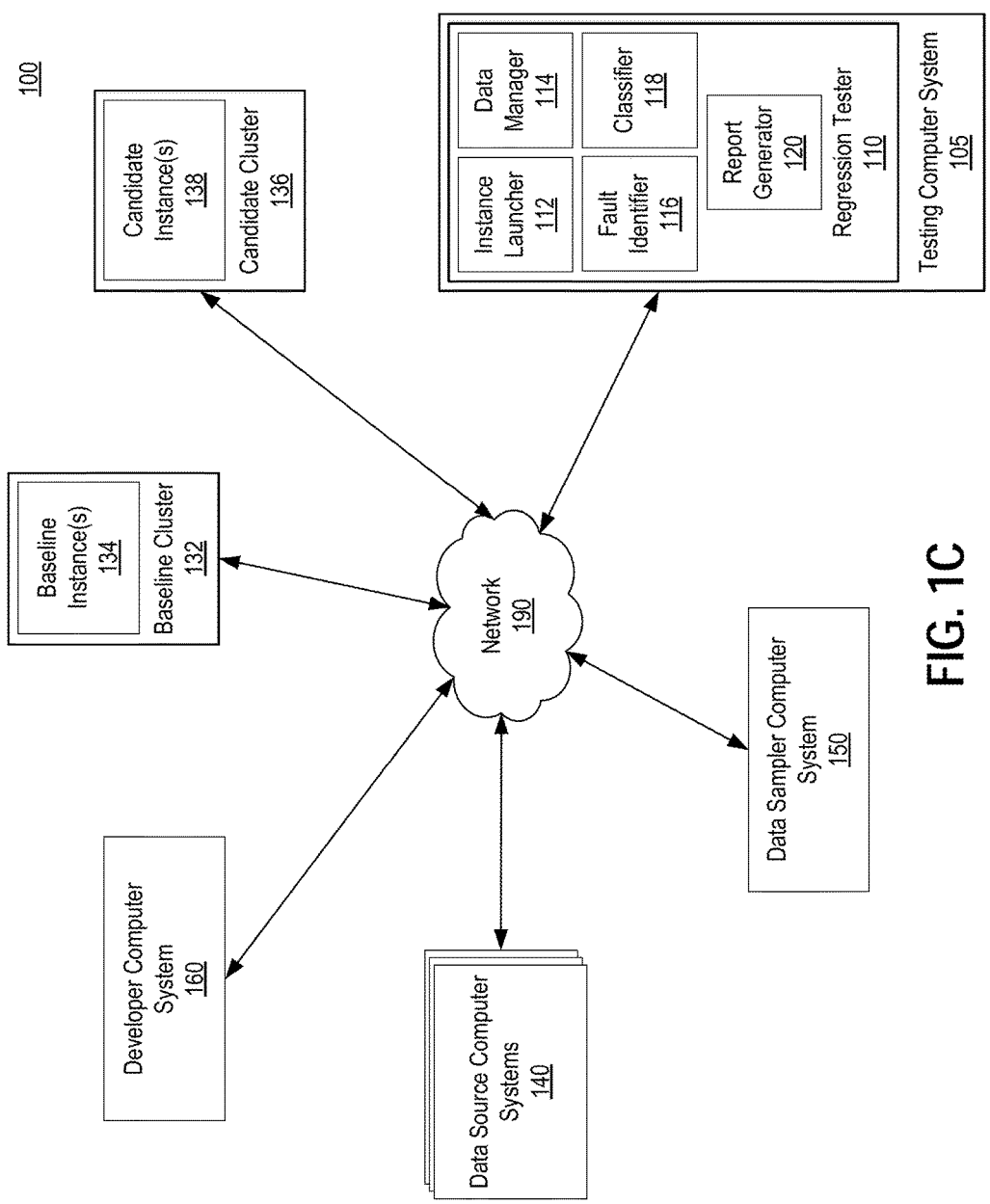

In some embodiments, regression tester 110 can establish communication with computing clusters executing instances of source code for a code base for a candidate version of the source code and a baseline version of the source code. A computer cluster can include a set of connected computers working together that can be viewed as a single system. The connected computers of the cluster can be referred to as nodes and each node of the cluster may be set to perform the same task, controlled and scheduled by a managing application. FIG. 1C shows one embodiment where regression tester 110 executing on test computer system 105 communicates with baseline cluster 132, which can include one or more nodes executing one or more baseline instances 134. Baseline instances 134 can each execute a baseline version of source code for a code base. In the embodiment of FIG. 1C, regression tester 110 can also communicate with candidate cluster 136, which can include one or more nodes executing one or more candidate instances 138. Candidate instances 138 can each execute a candidate version of source code for a code base.

According to some embodiments, data manager 114 can provide data samples to both baseline instances 134 and candidate instances 136 and obtain outputs based on the provided data samples. The outputs can reflect performance values in some embodiments. Data manager 114 may communicate with classifier 118 to analyze the outputs and determine one or more faults in the candidate version for the source code of the code base. In some embodiments, the determined one or more faults are related to performance values.

In some embodiments, classifier 118 can determine whether portions, such as a function or method, of the candidate version for the source code passes or fails regression testing based on baseline outputs received from baseline instances 134 and candidate outputs received from candidate instances 138. Classifier 118 can perform operations to statistically compare the baseline outputs and the candidate outputs, and when the candidate outputs significantly deviate from the baseline outputs (as described in more detail below), classifier 118 may determine that the portion of source code producing the candidate outputs includes a fault.

In some embodiments, the operations performed by classifier 118 can include determining a sample count. A sample count may represent the number of data samples provided to baseline instance 134 and candidate instance 138 to obtain the baseline outputs and the candidate outputs for a portion of the source code tested by regression tester 110. For example, data manager 114 may provide 1000 data samples that result in a call to a getPhoto( ) method on baseline instances 134 and candidate instances 138. In some embodiments, data manager 114 may calculate response time values for the baseline outputs and candidate outputs based on the length of time it takes baseline instances 134 and candidate instances 138 to respond to the getPhoto( ) method call. In some embodiments, the baseline outputs and candidate outputs respectfully received from baseline instances 134 and candidate instances 138 for the getPhoto( ) method can include a response time value. Classifier 118 may use the response time value to evaluate whether the getPhoto( ) method of the candidate version decreased in performance from the baseline version of the getPhoto( ) method. In this example, the sample count is 1000. In some embodiments, classifier 118 may use the sample count to determine whether to perform further analysis on the response time values for the getPhoto( ) method or whether to ignore the response time values. In some embodiments, classifier 118 can compare the sample count to a sample count threshold. The sample count threshold can be set programmatically, by a configuration file, or by the user through a user interface or command line prompt, according to some implementations. In the example above, if the sample count threshold is 800, then classifier 118 may perform additional analysis on the response time values. But, if the sample count threshold is 5000, then classifier 118 may ignore the response time values until the sample count threshold is satisfied, if at all.

In some embodiments, the operations performed by classifier 118 can include determining a relative threshold. A relative threshold may include one or more calculations that compare the range or variance of the baseline outputs with respect to a comparison of the baseline outputs to the candidate outputs. For example, in one embodiment, a relative threshold value may represent (as a ratio) the variance of the baseline outputs compared to the difference between the median of the candidate outputs and the median of the baseline outputs. For example, when the response time values for the baseline outputs are 92 ms, 95 ms, 100 ms, and 105 ms and the response time values for the candidate outputs are 100 ms, 97 ms, 102 ms, and 104 ms, the relative threshold value may be 9.33 by taking the variance in the baseline outputs' response time values (32.67) and dividing by the difference between the median of the candidate outputs' response time values and the median of the baseline outputs' response time values (abs (97.5–101) or 3.5). In another example, if the response time values for the baseline outputs are 92 ms, 95 ms, 100 ms, and 105 ms and the response time values for the candidate outputs are 115 ms, 125 ms, 130 ms, and 78 ms, the relative threshold value may be 1.45. In some embodiments, classifier 118 can compare the calculated relative threshold value to a limit value, such as a relative threshold limit, and if the relative threshold value does not satisfy the relative threshold limit, classifier 118 may determine that there is a fault related to performance in the candidate version of the source code. For example, when the relative threshold limit is 5, a calculated relative threshold value of 9.33 would satisfy it and the classifier 118 may not determine there is a fault. But, when the relative threshold limit is 5, a calculated relative threshold value of 1.45 would not satisfy it and the classifier 118 may determine there is a fault.

In some embodiments, the operations performed by classifier 118 can include determining an absolute threshold value. An absolute threshold may include one or more calculations that compare the baseline outputs to the candidate outputs. For example, in one embodiment, an absolute threshold value may represent (as a ratio) the difference between the median of the baseline output values and the median of the candidate output values compared to the median of the baseline output values. For example, when the response time values for the baseline outputs are 92 ms, 95 ms, 100 ms, and 105 ms and the response time values for the candidate outputs are 100 ms, 97 ms, 102 ms, and 104 ms, the absolute threshold value may be 0.0359 by taking the difference between the median of the response time values for the baseline outputs and the median of the response times for the candidate outputs (abs(97.5–101) or 3.5) and dividing by the median response time values for the baseline outputs (97.5). In another example, if the response time values for the baseline outputs are 92 ms, 95 ms, 100 ms, and 105 ms and the response time values for the candidate outputs are 115 ms, 125 ms, 130 ms, and 78 ms, the absolute threshold value may be 0.2307. In some embodiments, classifier 118 can compare the calculated absolute threshold value to a limit value, such as an absolute threshold max, and if the calculated absolute threshold value does not satisfy the absolute threshold max, classifier 118 may determine that there is a fault related to performance in the candidate version of the source code. For example, when the absolute threshold max is 0.2, a calculated absolute threshold value of 0.0359 would satisfy it and the classifier 118 may not determine there is a fault. But, when the absolute threshold max is 0.2, a calculated relative threshold value of 0.231 would not satisfy it and the classifier 118 may determine there is a fault.

In some embodiments, classifier 118 and include comparing the median absolute deviation (MAD) of the baseline outputs to the MAD of the candidate outputs. The MAD may be the median of the absolute deviations from a dataset's median. For example, when the response time values for the baseline outputs are 92 ms, 95 ms, 100 ms, and 105 ms, the median of the response time values for the baseline outputs is 97.5. The respective absolute deviations from the response time values for the baseline outputs are 5.5, 2.5, 2.5, and 7.5, which has a median of 4. Thus, the MAD for the response time values for the baseline outputs is 4. As another example, when the response time values for the candidate instance are 100 ms, 97 ms, 102 ms, and 104 ms, the MAD for the response time values for the candidate outputs is 2, and when the response time values for the candidate instance are 115 ms, 125 ms, 130 ms, and 78 ms, the MAD for the response time values for the candidate outputs is 7.5. In some embodiments, classifier 118 detects a fault related to performance in the candidate version of the source code if the MAD for the candidate outputs is greater than the MAD for the baseline outputs. In some embodiments, a margin of error can be used in the comparison. For example, classifier 118 may detect a fault when the MAD for the candidate outputs is greater than 125% of the MAD for the baseline outputs.

In some embodiments, classifier 118 may use a combination of sample count, relative threshold, absolute threshold, and MAD analyses to determine whether there is a fault related to performance in the candidate version of the source code. For example, classifier 118 may detect a fault when the sample count threshold is satisfied and each of the relative threshold, the absolute threshold, and the MAD analyses indicate there is a fault. In some embodiments, classifier 118 may use different combinations of sample count, relative threshold, absolute threshold and MAD analyses. For example, classifier 118 may detect a fault in the candidate version of the source code when the sample count threshold, the absolute threshold, and the MAD analyses indicate there is a fault.

Although FIGS. 1A-1C depict testing computer system 105, data source computer systems 140, data sampler computer system 150, and developer computer system 160 as separate computing systems located at different nodes on network 190, the operations of one of these computing systems can be performed by another without departing from the spirit and scope of the disclosed embodiments. For example, in some embodiments, the operations of data sampler computer system 150 and testing computer system 105 can be performed by one physical or logical computing system. Also, as another example, the operations performed by data sampler computer system 150 and testing computer system 105 can be performed by developer computer system 160 in some embodiments. Thus, the logical and physical separation of operations among the computing systems depicted in FIG. 1A is for the purpose of easing discussion concerning the disclosed embodiments and is not intended to limit the scope of any claims arising from it.

Figure 2:
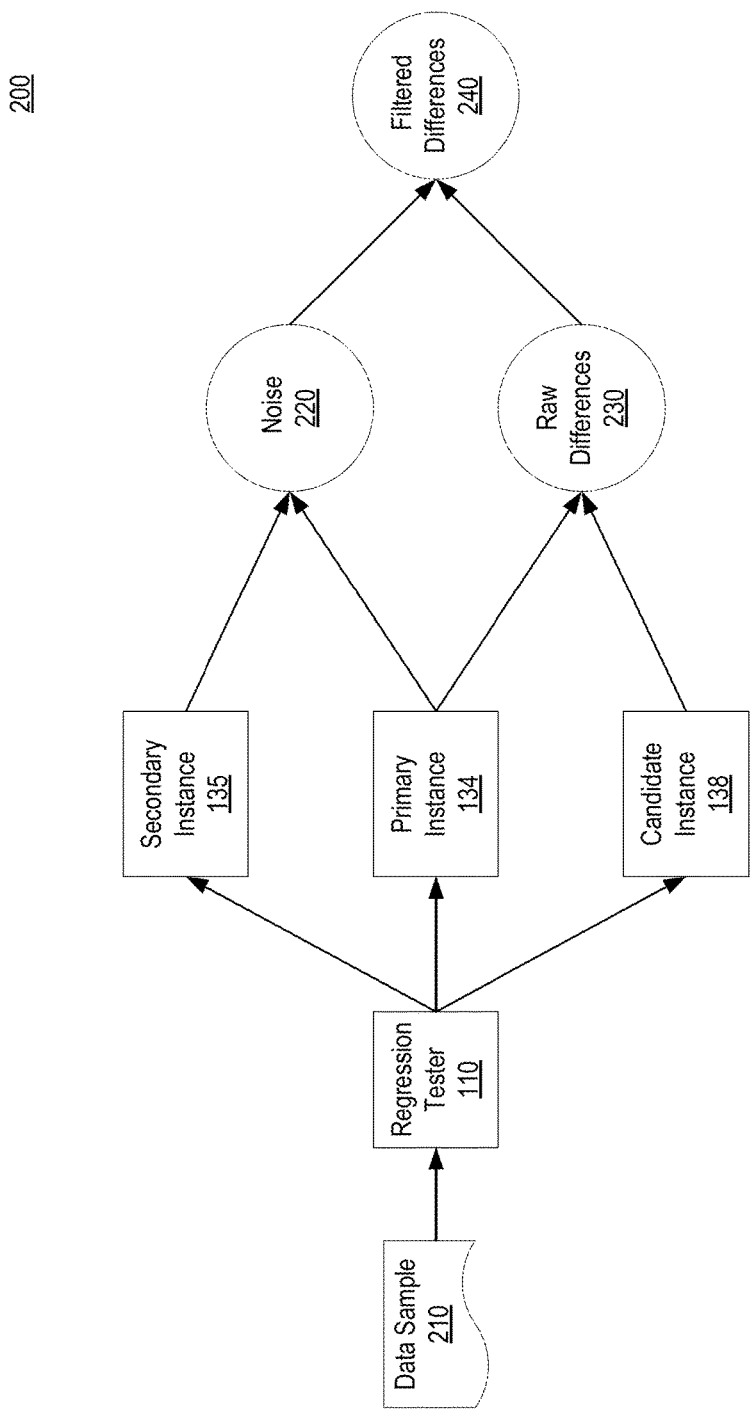
FIG. 2 is an example topology for functional regression testing consistent with disclosed embodiments.

FIG. 2 illustrates, in block form, and example topology 200 for performing functional regression testing consistent with disclosed embodiments. Functional regression testing may refer to regression testing of functional aspects of source code for a code base. For example, functional regression testing may include testing for software defects such as null pointer references, array out of bounds errors, or improper calculation of data.

As shown in FIG. 2, regression tester 110 obtains data sample 210 and it applies data sample 210 as input to primary instance 134, secondary instance 135, and candidate instance 138. As described above, primary instance 134 can execute a baseline version of source code for a code base undergoing regression testing. Secondary instance 135 also executes the baseline version of the source code for the code base. According to some embodiments, the baseline version of source code may be a version that may have already passed regression testing and may be considered suitable for release or for regression testing future unreleased versions of the source code for the code base. Candidate instance 138 can execute a candidate version of the source code for the code base. In some embodiments, the candidate version of source code may be a future version of the source code for the code base that is under development and being regression tested by regression tester 110.

In some embodiments, the output of primary instance 134 and secondary instance 135 can be used to determine noise 220. In some embodiments, noise 220 represents output for a data field that is different when data sample 210 is applied as input to primary instance 134 and secondary instance 135. When output for a data field is different based on the same input to primary instance 134 and secondary instance 135—which are executing the same version of source code—regression tester 110 can determine that the data field provides output that cannot be determined for a known input. As a result, the data field may be unsuitable when analyzing raw differences 230. Accordingly, regression tester 110 may, in some embodiments, analyze filtered differences 240 instead of raw differences 230 when determining whether there are faults in the candidate version of the source code executed by candidate instance 138. In some embodiments, filtered differences 240 exclude from raw differences 230 the data fields of noise 220.

Figure 3:
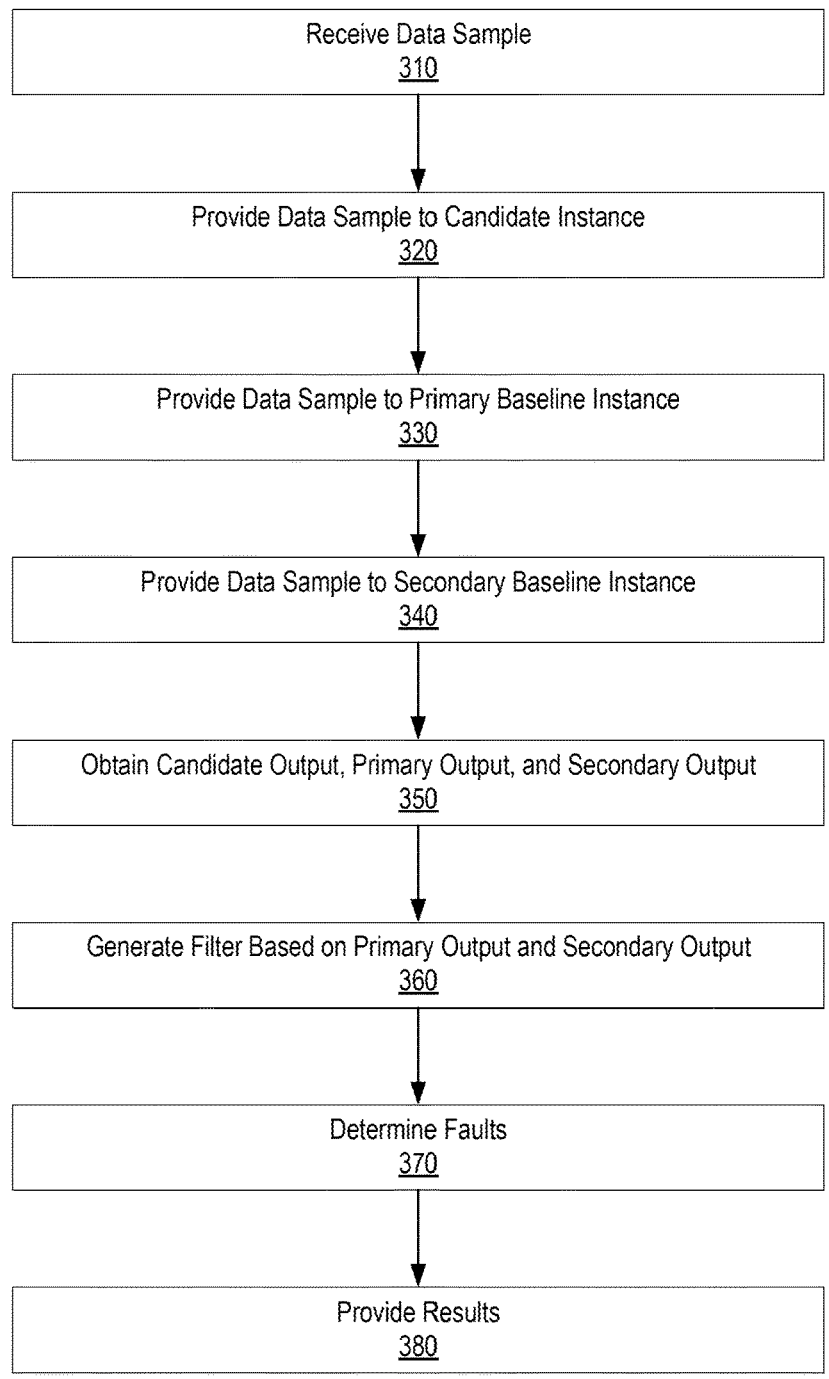
FIG. 3 shows a flow chart for a process for functional regression testing consistent with disclosed embodiments.

FIG. 3 shows a flowchart representing an example process 300 for performing functional regression testing on source code for a software code base. According to some embodiments, process 300 can be performed by one or more components of a regression tester such as regression tester 110. Although the following discussion below describes process 300 as being performed by a regression tester, other components of a computer system configured to perform functional regression testing can perform process 300 without departing from the spirit and scope of the present disclosure.

Process 300 begins at step 310 where the regression tester receives a data sample. As described in more detail above, the data sample may represent a sample of production traffic, a sample of staged traffic, or some combination of production traffic samples and stage traffic samples. The regression tester may then provide the data sample to a candidate instance at step 320. As described above, a candidate instance can include a process executing a candidate version of source code for a code base. In some embodiments, the code base may be for a service or the code base may be for an application that processes data. The candidate version may be a version of the source code that is undergoing regression testing.

In some embodiments, process 300 continues as the regression tester provides the data sample to a primary baseline instance (at step 330) and a secondary baseline instance (at step 340). The primary baseline instance can include a process executing a baseline version of source code for the code base. The baseline version of source code can be different than the candidate version of the source code. In addition the baseline version may be a version of the source code that is considered stable, has already undergone regression testing and/or has already been released or deployed in production. The secondary baseline instance can also include a process executing the baseline version of the source code for the code base. The baseline version of the source code executed by the secondary baseline instance is the same as the source code executed by the primary baseline instance.

According to some embodiments, the regression tester continues execution of process 300 by obtaining candidate output, primary output, and secondary output (step 350). The candidate output can include output based on the data sample provided to the candidate instance. The primary output can include output based on the data sample provided to the primary instance. The secondary output can include output based on the data sample provided to secondary instance.

At step 360, the regression tester can generate a filter based on the primary output and the secondary output. The filter can be used for excluding one or more data fields when comparing the primary output and the candidate output to determine faults at step 370. The filter can include the identification of a value for a data field where the primary output and the secondary output differ. When determining faults at step 370, the regression tester may apply the filter to exclude the data field from the comparison.

Figure 6:
FIG. 6 shows an example user interface consistent with disclosed embodiments.

Once the regression tester determines faults at step 370, the regression tester can provide results at step 380. In some embodiments, the regression tester can provide results using a user interface that describes the results of the regression testing. FIGS. 6 and 7 show examples of user interfaces that the regression tester can provide. In some embodiments, the regression tester may provide results in a text file, data object, or a response to a request in addition to, or in lieu of, providing a user interface. As used herein, providing a user interface can include providing images, providing graphics, or providing instructions for generating images or graphics of the user interface.

Figure 4:
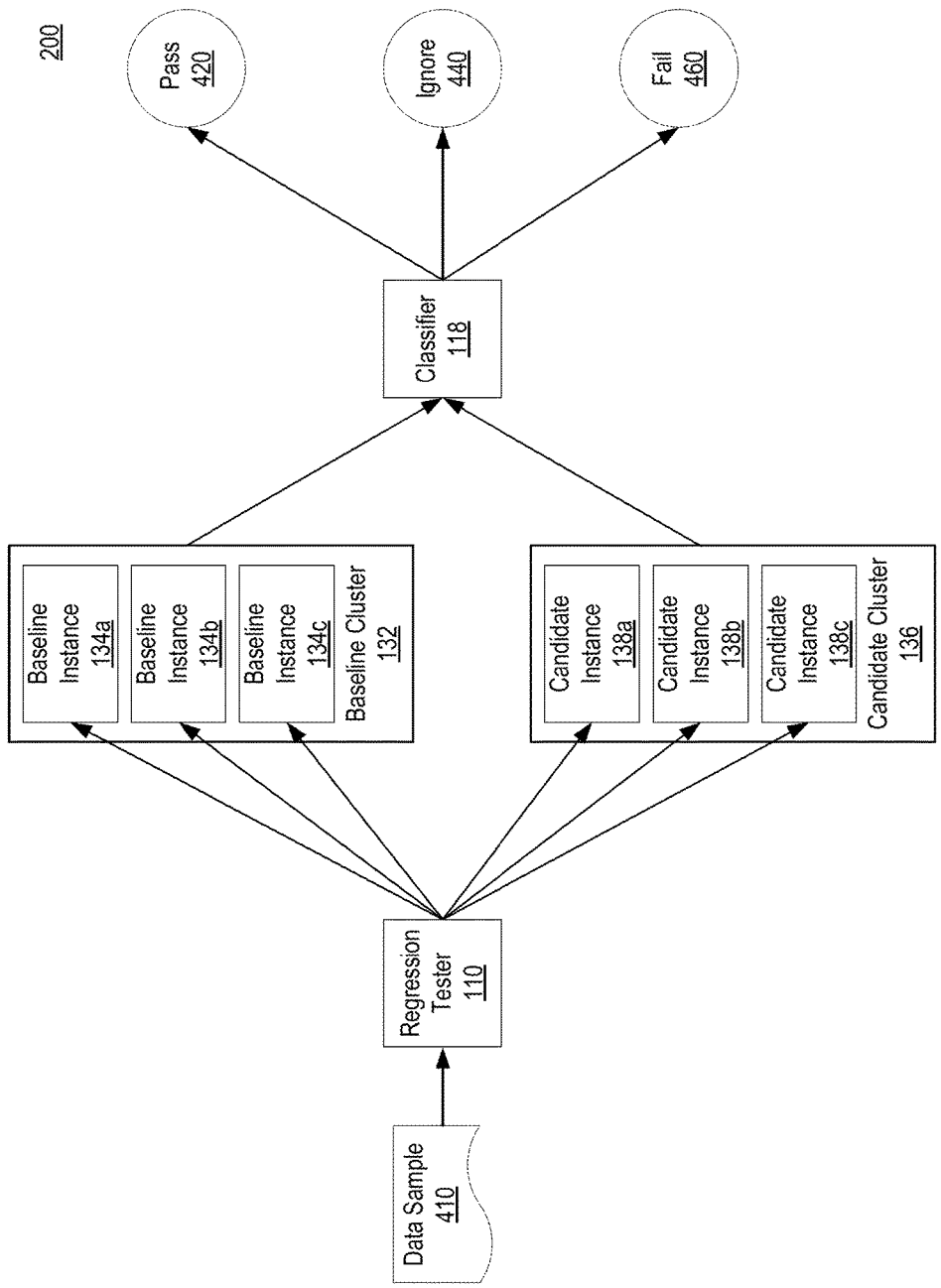
FIG. 4 is an example topology for performance regression testing consistent with disclosed embodiments.

FIG. 4 illustrates, in block form, an example topology 400 for performing performance regression testing consistent with disclosed embodiments. Performance regression testing may refer to regression testing performance aspects of source code for a code base. For example, performance regression testing may include testing for performance related software defects such as response times, memory usage, processor usage, or latencies.

As shown in FIG. 4, regression tester 110 obtains data sample 410 and applies it as input to baseline instances 134*a-c* executing in baseline cluster 132. Regression tester 110 also applies data sample 410 as input to candidate instances 138*a-c*. As described above, baseline instances 134*a-c* can execute a baseline version of source code for a code base undergoing regression testing. Each of baseline instances 134*a-c* executes the same baseline version of the source code. According to some embodiments, the baseline version of the source code can be a version that may have already passed regression testing and may be considered suitable for release or for regression testing future unreleased versions of the source code for the code base. Candidate instances 138*a-c* can execute a candidate version of the source code for the code base. In some embodiments, the candidate version of source code may be a future version of the source code for the code base that is under development and being regression tested by regression tester 110.

In some embodiments, baseline outputs from baseline instances 134*a-c* and candidate outputs from candidate instances 138*a-c* are obtained by classifier 118. Classifier 118 may perform one or more statistical operations, such as the statistical operations described above with respect to FIG. 1C, on the baseline outputs and the candidate outputs to determine whether the candidate version of source code results in pass 420 or fail 460. In some embodiments, classifier 118 may determine the candidate outputs should be ignored (ignore 440). Classifier 118 may ignore candidate outputs in some embodiments because there is insufficient sample count in data sample 410 to determine whether candidate outputs indicate a fault in the candidate version of the source code.

Figure 5:
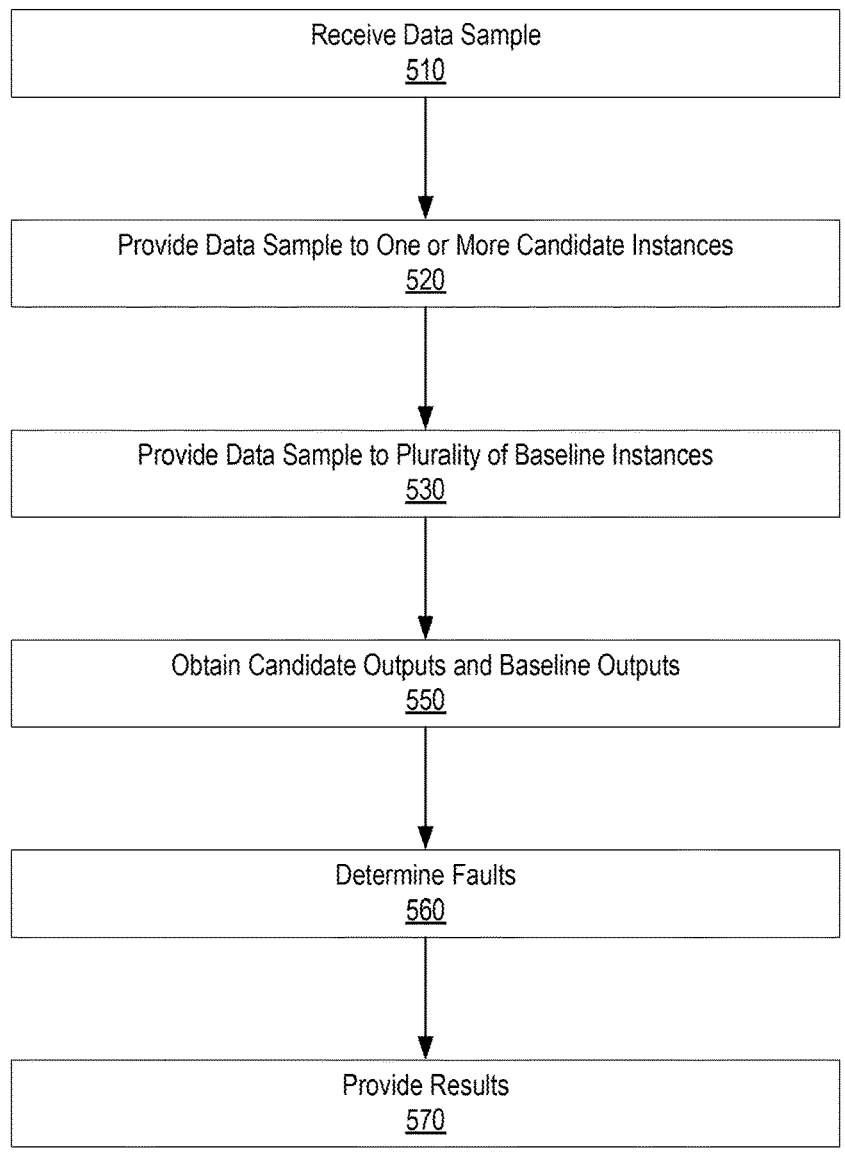
FIG. 5 shows a flow chart for a process for functional or performance regression testing consistent with disclosed embodiments.

FIG. 5 shows a flowchart representing an example process 500 for performing functional or performance regression testing on source code for a software code base. According to some embodiments, process 500 can be performed by one or more components of a regression tester such as regression tester 110. Although the following discussion describes process 500 as being performed by a regression tester, other components of a computer system configured to perform functional regression testing can perform process 500 without departing from the spirit and scope of the present disclosure.

Process 500 begins at step 510 where the regression tester receives a data sample. As described in more detail above, the data sample may represent a sample of production traffic, a sample of staged traffic, or some combination of production traffic samples and stage traffic samples. The regression tester may provide the data sample to one or more candidate instances at step 520. Consistent with disclosed embodiments, a candidate instance can include a process executing a candidate version of source code for a code base. The candidate version may be a version of the source code that is undergoing regression testing. In embodiments where process 500 performs performance regression testing, the regression tester may provide the data sample to multiple candidate instances. And, as described above with respect to FIG. 1C, multiple candidate instances may be executing within a computing cluster. In some embodiments, the plurality of candidate instances may be executing on a separate server computer systems, or separate processes within the same computer system, In some embodiments, process 500 may be used to perform functional regression testing and in such embodiments the regression tester may provide the data sample to one candidate instance.

At step 530, the regression tester provides the data sample to a plurality of baseline instances. Consistent with disclosed embodiments, each of the plurality of baseline instances can execute a baseline version of the source code for the code base. The baseline version of source code can be different than the candidate version of the source code. In addition, the baseline version may be a version of the source code that is considered stable, has already undergone regression testing and/or has already been released or deployed in production. In some embodiments, the plurality of baseline instances may be executing within a computing cluster. In some embodiments, the plurality of baseline instances may be executing on a separate server computer systems, or separate processes within the same computer system. Process 500 may be used to perform functional regression testing and in such embodiments the plurality of baseline instances can include a primary instance and a secondary instance consistent with disclosed embodiments.

The regression tester continues execution of process 500 at step 550 where it obtains candidate outputs and baseline outputs. In some embodiments, the candidate outputs and baseline outputs are based on data samples provided to the one or more candidate instances or the plurality of baseline instances respectfully. In some embodiments, the regression tester may calculate the candidate outputs and/or the baseline outputs, for example, when performing performance regression testing. In such embodiments, the candidate outputs and/or the baseline outputs can include response times calculated by the regression tester when making requests to the one or more candidate instances or the plurality of baseline instances using the data sample.

Once the regression tester obtains the candidate outputs and the baseline outputs, it can determine faults in the candidate version of the source code at step 560. Consistent with embodiments disclosed above, the regression tester determines faults by generating a filter that excludes one or more data fields from a comparison of the candidate outputs and the baseline outputs. In some embodiments, the regression tester can determine faults based on operations performed by a classifier, such as classifier 118 described above with respect to FIG. 1C.

At step 570 the regression tester can provide results of the functional or performance regression testing. In some embodiments, the regression tester can provide results using a user interface that describes the results of the regression testing. In some embodiments, the regression tester may provide results in a text file, data object, or a response to a request in addition to or in lieu of providing a user interface.

FIG. 6 shows an example user interface 600 that regression tester 110 provides (and in some embodiments, report generator 120 of regression tester 110 provides). User interface 600 can be, for example, a webpage that can be rendered in a web browser or other client application capable of displaying web content or a user interface that is rendered as part of a user application.

In the example user interface 600, regression testing results corresponding to a service code base named TimelineService is shown. User interface 600 can include method list 620 which can display the methods of TimelineService that have the highest number of detected faults. When one of the methods in method list 620, such as getActivityUsersTimeline, is selected, user interface 600 can display more detailed fault information in information panel 625 and information panel 630. In the embodiment of user interface 600, information panel 625 displays the number of requests that the regression tester has sent to the getActivityUsersTimeline, the number of differences found in the outputs of getActivityUsersTimeline, and the percentage of faults detected.

In some embodiments, information panel 630 includes trace information that a user can select to cause the display of more detailed fault information. For example, in information panel 630 of FIG. 6, a user has selected a result data field that expanded to display an error data field and a success data field. The user selected the error data field that expanded to display a message data field and two fault types: ExtraField and MissingField. The user selected the success data field that expanded to show an entries data field and two fault types that are also ExtraField and MissingField. The user has also selected the entries data field that expanded to show the SeqSizeDifference fault type.

In some embodiments, user interface 600 can display more specific information for detected faults responsive to a user input event selecting a fault type in information panel 630. For example, when the user selects the SeqSizeDifference fault type in information panel 630, user interface 600 may display fault details list 640. Fault details list 640 can include a list of data for the fault type selected by the user. For example fault details list 640 includes several SeqSizeDifference faults detected by the regression tester in the candidate version of TimelineService.

In some embodiments, user interface 600 can include exclude noise user control 650, which is shown as a selectable switch in user interface 600. When selected by a user, exclude noise user control can cause user interface 600 to exclude noisy data from its display. For example, if exclude noise user control 650 is toggled to off, information panel 630 may include differences that have noise, such as results where the primary instance and the secondary instance produced different output for the same input data sample. But, if exclude noise user control 650 is toggled to on, information panel 630 may exclude noisy results from its display and display those data fields where the primary instance and the secondary instance produced the same output for the same input data sample and the primary instance and the candidate instance produced different output for the input data sample.

According to some embodiments when a user selects one of the items in fault details list 640, user interface 600 may display a dialog panel in response showing a comparison between the primary output and the candidate output giving rise to the detection of a fault. FIG. 7 shows an example dialog panel 720 that user interface 600 displays in response to a user selecting item 710 in fault details list 640. In some embodiments, dialog panel 720 can include the name of the request triggering the fault ("timeline queries") and the primary output values 730 and the candidate output values 740 triggering the detection of a fault. In some embodiments, dialog panel 720 may highlight the portion of the primary output and the candidate output that differs. For example in the embodiment shown in FIG. 7, highlight 750 shows that the primary output includes a third item in the entries vector object ("user_id:294") that is not included in the candidate output.

Figure 8:
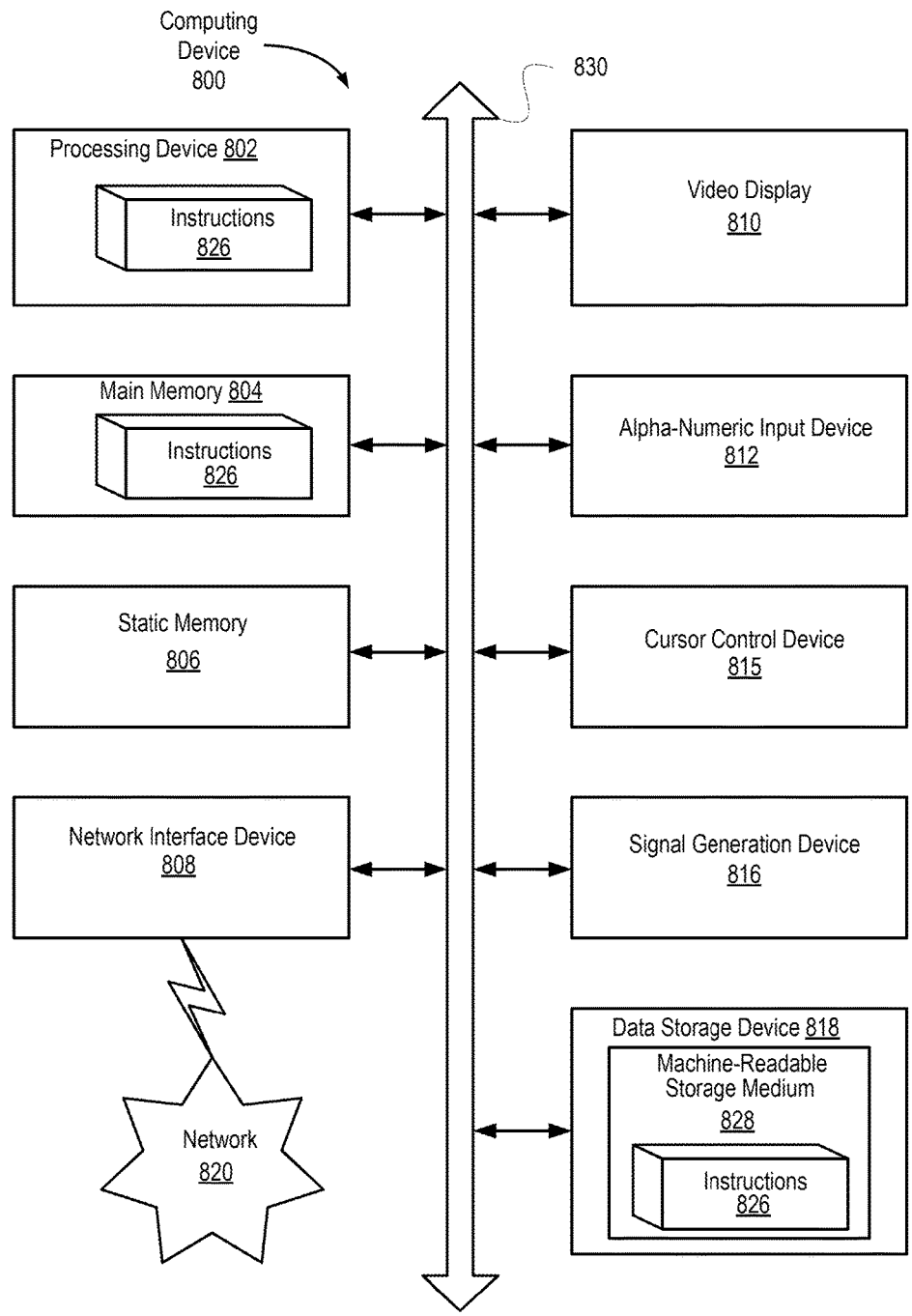
FIG. 8 shows an example computer device consistent with disclosed embodiments.

FIG. 8 illustrates a diagrammatic representation of a machine in the example form of a computing device 800 within which a set of instructions, for causing the machine to perform any one or more of the processes discussed above may be executed. The computing device 800 may include a mobile phone, a smart phone, a netbook computer, a personal computer, a laptop computer, a tablet computer, a desktop computer, a camera, etc., within which a set of instructions, for causing the machine to perform any one or more of the methodologies discussed herein, may be executed. In one implementation, the computing device 800 may perform regression testing and present GUIs to a user describing the results of the regression testing (as discussed above). The machine may be connected (e.g., networked) to other machines in a LAN, an intranet, an extranet, or the Internet. The machine may operate in the capacity of a client machine in client-server network environment. Further, while only a single machine is illustrated, the term "machine" shall also be taken to include any collection of machines that individually or jointly execute a set (or multiple sets) of instructions to perform any one or more of the methodologies discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 (e.g., instructions for an application ranking system) for performing the operations and steps discussed herein.

The computing device 800 may further include a network interface device 808 which may communicate with a network 820. The computing device 800 also may include a video display unit 810 (e.g., a liquid crystal display (LCD), a light-emitting diode (LED), or organic light emitting diode (OLED) display), an alphanumeric input device 812 (e.g., a keyboard), a cursor control device 814 (e.g., a trackball, a trackpad, or a mouse) and a sound generation device 816 (e.g., a speaker). In one implementation, the video display unit 810, the alphanumeric input device 812, and the cursor control device 814 may be combined into a single component or device (e.g., an LCD touch screen).

The data storage device 818 may include a computer-readable storage medium 828 on which is stored one or more sets of instructions 826 (e.g., instructions for the regression tester) embodying any one or more of the methodologies or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 820 via the network interface device 808.

While the computer-readable storage medium 828 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

The algorithms and systems presented herein are not inherently related to any particular computer or other apparatus. Various general purpose systems may be used with programs in accordance with the teachings herein, or it may prove convenient to construct a more specialized apparatus to perform the required method steps. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the aspects enumerated below, along with the full scope of equivalents to which such aspects are entitled.

What is claimed is:

1. A method for performing regression testing on source code for a software code base, the method comprising:
   multicasting a data sample as input to a candidate instance executing a candidate version of the source code on a first computing cluster;
   multicasting the data sample to a primary baseline instance executing a baseline version of the source code on a second computing cluster, wherein the baseline version of the source code and the candidate version of the source code differ;
   multicasting the data sample to a secondary baseline instance executing the baseline version of the source code on the second computing cluster;
   obtaining a candidate output from the candidate instance, the candidate output being based on the data sample provided to the candidate instance;
   obtaining a primary output from the primary baseline instance, the primary output being based on the data sample provided to the primary baseline instance;
   obtaining a secondary output from the secondary baseline instance, the secondary output being based on the data sample provided to the secondary baseline instance;
   comparing the primary output and the secondary output to generate a filter for excluding one or more data fields when comparing the primary output and the candidate output;
   determining one or more faults in the candidate version of the source code by comparing the primary output and the candidate output;
   presenting an exclude noise user control in a user interface, a first setting of the exclude noise user control corresponding to applying the generated filter to the candidate output before determining the one or more faults, and a second setting of the exclude noise user control corresponding to not applying the generated filter to the candidate output before determining the one or more faults;
   determining statistics regarding at least one method of one or more methods of the candidate version of the source code having the one or more faults, the statistics reflecting at least one of a number of times input was provided to the method, a percentage of times an input resulted in a fault, or a percentage of times the primary output and the secondary output differed from each other; and
   presenting, in the user interface, a selectable list including one or more methods of the candidate version of the source code having the one or more faults, the selectable list including the statistics regarding the method, wherein the selectable list depends on a setting of the exclude noise user control.

2. The method of claim 1 wherein generating the filter includes identifying a value for at least one of the one or more data fields that is different in the primary output and the secondary output.

3. The method of claim 2 wherein the exclude noise user control has the first setting, and wherein applying the generated filter to the candidate output and the primary output includes excluding the one of the one or more data fields in the determination of the one or more faults.

4. The method of claim 1 wherein the code base is for a service.

5. A regression testing system for performing regression testing on source code comprising:
   a processor;
   a memory storing instructions that when executed by the processor cause the processor to perform operations of:
   multicasting a data sample to one or more candidate instances executing a candidate version of the source code on a first computing cluster;
   multicasting the data sample to a plurality of baseline instances executing a baseline version of the source code on a second computing cluster, wherein the baseline version of the source code and the candidate version of the source code differ;
   obtaining candidate outputs from the one or more candidate instances, the candidate outputs being based on to the data sample provided to the one or more candidate instances;
   obtaining baseline outputs from the plurality of baseline instances, the baseline outputs being based on the data sample provided to the plurality of baseline instances;
   determining one or more faults in the candidate version of the source code by comparing the candidate outputs to the baseline outputs;
   presenting an exclude noise user control in a user interface, a first setting of the exclude noise user control corresponding to applying a filter to the candidate outputs before determining the one or more faults, and a second setting of the exclude noise user control corresponding to not applying the filter to the candidate outputs before determining the one or more faults;
   determining statistics regarding at least one method of one or more methods of the candidate version of the source code having the one or more faults, the statistics reflecting at least one of a number of times input was provided to the method, a percentage of times an input resulted in a fault, or a percentage of times the primary output and the secondary output differed from each other; and
   presenting, in the user interface, a selectable list including one or more methods of the candidate version of the source code having the one or more faults, the selectable list including the statistics regarding the method, wherein the selectable list depends on a setting of the exclude noise user control.

6. The regression testing system of claim 5 wherein determining the one or more faults in the candidate version includes comparing output from one of the plurality of baseline instances to output from another of the plurality of baseline instances to generate the filter, the filter configured for excluding one or more data fields when comparing the candidate outputs to the baseline outputs.

7. The regression testing system of claim 6 wherein generating the filter includes identifying a value that is different for at least one of the one or more data fields in the output from one of the plurality of baseline instances and the output from the another of the plurality of baseline instances.

8. The regression testing system of claim 7 wherein determining the one or more faults in the candidate version of the source code includes applying the generated filter to exclude the one of the one or more data fields.

9. The regression testing system of claim 5 wherein determining the one or more faults includes a determination of a sample count.

10. The regression testing system of claim 5 wherein determining the one or more faults includes a determination of a relative threshold calculated based on a variance within the baseline outputs and a difference between the baseline outputs and the candidate outputs.

11. The regression testing system of claim 5 wherein determining the one or more faults includes a determination of an absolute threshold based on a difference between the baseline outputs and the candidate outputs when compared to the baseline outputs.

12. The regression testing system of claim 5 wherein determining the one or more faults includes comparing a median absolute deviation for the baseline outputs and a median absolute deviation for the candidate outputs.

13. The regression testing system of claim 5 wherein the baseline outputs and the candidate outputs include performance values.

14. The regression testing system of claim 5 wherein execution of the one or more candidate instances occurs on a computing cluster, wherein each of the one or more candidate instances is executed by a different processor in the computing cluster.

15. The regression testing system of claim 5 wherein execution of the plurality of baseline instances occurs on a computing cluster, wherein each of the baseline instances is executed by a different processor in the computing cluster.

16. A method for performing regression testing on source code for a service, the method comprising:
    multicasting sample data as input to a plurality of candidate services executing an instance of a candidate version of the source code for the service on a first computing cluster;
    multicasting the sample data as input to a plurality of baseline services executing an instance of a baseline version of the source code for the service on a second computing cluster, wherein the baseline version of the source code and the candidate version of the source code differ;
    obtaining candidate outputs from the plurality of candidate services, wherein the candidate outputs describe a candidate performance metric for the candidate version of the source code for the service;
    obtaining baseline outputs from the plurality of baseline services, wherein the baseline outputs describe a baseline performance metric for the baseline version, the baseline performance metric having a same type as the candidate performance metric;
    determining one or more faults in the candidate version of the source code for the service by comparing the candidate outputs to the baseline outputs;
    presenting an exclude noise user control in a user interface, a first setting of the exclude noise user control corresponding to applying a filter to the candidate outputs before determining the one or more faults, and a second setting of the exclude noise user control corresponding to not applying the filter to the candidate outputs before determining the one or more faults;
    determining statistics regarding at least one method of one or more methods of the candidate version of the source code having the one or more faults, the statistics reflecting at least one of a number of times input was provided to the method, a percentage of times an input resulted in a fault, or a percentage of times the primary output and the secondary output differed from each other; and
    presenting, in the user interface, a selectable list including one or more methods of the candidate version of the source code having the one or more faults, the selectable list including the statistics regarding the method, wherein the selectable list depends on a setting of the exclude noise user control.

17. The method of claim 16 wherein determining the one or more faults includes a determination that a sample count corresponding to the sample data satisfies a sample count threshold.

18. The method of claim 17 wherein determining the one or more faults further includes a determination that at least one of a relative threshold, an absolute threshold, or a median absolute deviation threshold is satisfied, wherein:
    the relative threshold is determined based on a variance within the baseline outputs and a difference between the baseline outputs and the candidate outputs,
    the absolute threshold is determined based on a difference between the baseline outputs and the candidate outputs when compared to the baseline outputs, and
    the median absolute deviation threshold is determined based on comparing a median absolute deviation for the baseline outputs and a median absolute deviation for the candidate outputs.

* * * * *

UNITED STATES PATENT AND TRADEMARK OFFICE
CERTIFICATE OF CORRECTION

PATENT NO. : 10,146,676 B1
APPLICATION NO. : 15/194106
DATED : December 4, 2018
INVENTOR(S) : Khanduri Page 1 of 1

It is certified that error appears in the above-identified patent and that said Letters Patent is hereby corrected as shown below:

In the Claims

Column 24, Claim 5, Line 29, delete "on to" and insert -- on -- therefor.

Signed and Sealed this
Second Day of April, 2019

Andrei Iancu
*Director of the United States Patent and Trademark Office*